(12) United States Patent
Son et al.

(10) Patent No.: US 11,078,932 B2
(45) Date of Patent: Aug. 3, 2021

(54) HYDRAULIC MACHINE

(71) Applicant: VOLVO CONSTRUCTION EQUIPMENT AB, Eskilstuna (SE)

(72) Inventors: Youngjin Son, Gyeongsangnam-do (KR); Seonggeun Yun, Gyeongsangnam-do (KR); Manseuk Jeon, Gyeongsangnam-do (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 16/772,174

(22) PCT Filed: Dec. 15, 2017

(86) PCT No.: PCT/KR2017/014885
§ 371 (c)(1),
(2) Date: Jun. 12, 2020

(87) PCT Pub. No.: WO2019/117383
PCT Pub. Date: Jun. 20, 2019

(65) Prior Publication Data
US 2021/0071688 A1    Mar. 11, 2021

(51) Int. Cl.
*F15B 13/06* (2006.01)
*E02F 9/22* (2006.01)
*F15B 11/17* (2006.01)

(52) U.S. Cl.
CPC ............ *F15B 13/06* (2013.01); *E02F 9/2239* (2013.01); *F15B 11/17* (2013.01)

(58) Field of Classification Search
CPC ....... E02F 9/2239; F15B 11/165; F15B 11/17; F15B 13/06
See application file for complete search history.

(56) References Cited

U.S. PATENT DOCUMENTS 5,289,680 A    3/1994 Obe et al.
5,596,341 A *  1/1997 Miller ...................... G09F 9/35
                                                   345/4

(Continued)

FOREIGN PATENT DOCUMENTS

KR    10-0643010 B1    11/2006

OTHER PUBLICATIONS

International Search Report and Written Opinion of the International Searching Authority, PCT/KR2017/014885/, dated Sep. 14, 2018, 13 pages.

(Continued)

*Primary Examiner* — F Daniel Lopez
*Assistant Examiner* — Matthew Wiblin
(74) *Attorney, Agent, or Firm* — Sage Patent Group

(57) ABSTRACT

A hydraulic machine is provided. A first flow control valve directs fluid from a first fluid supply to a first actuator when the first flow control valve is in a first position. A conflux control valve directs fluid from the first fluid supply to a second flow control valve when the conflux control valve is in a conflux position. The second flow control valve directs fluid from a second fluid supply and the first fluid supply to a second actuator when second flow control valve is in a second position. A bypass path allows the first fluid supply to communicate with the conflux control valve by passing around the first flow control valve.

16 Claims, 5 Drawing Sheets

(56) References Cited

U.S. PATENT DOCUMENTS

| | | | |
|---|---|---|---|
| 10,041,224 B2* | 8/2018 | Kondo | E02F 3/422 |
| 10,422,109 B2* | 9/2019 | Kawashima | E02F 9/22 |
| 10,662,619 B2* | 5/2020 | Sakamoto | F15B 11/0426 |
| 2003/0037465 A1 | 2/2003 | Toji et al. | |
| 2003/0089106 A1* | 5/2003 | Ioku | E02F 9/2239 |
| | | | 60/328 |
| 2004/0261405 A1 | 12/2004 | Lee | |
| 2008/0034746 A1* | 2/2008 | Verkuilen | F15B 11/162 |
| | | | 60/422 |
| 2009/0077839 A1* | 3/2009 | Horii | E02F 9/2285 |
| | | | 37/443 |
| 2010/0000211 A1 | 1/2010 | Ikeda et al. | |
| 2013/0129459 A1* | 5/2013 | Saotome | E02F 9/2239 |
| | | | 414/687 |
| 2018/0127949 A1* | 5/2018 | Nakajima | F15B 11/17 |

OTHER PUBLICATIONS

International Preliminary Report on Patentability of the International Preliminary Examining Authority, PCT/KR2017/014885/, dated May 8, 2020, 5 pages.

\* cited by examiner

[Fig. 1]
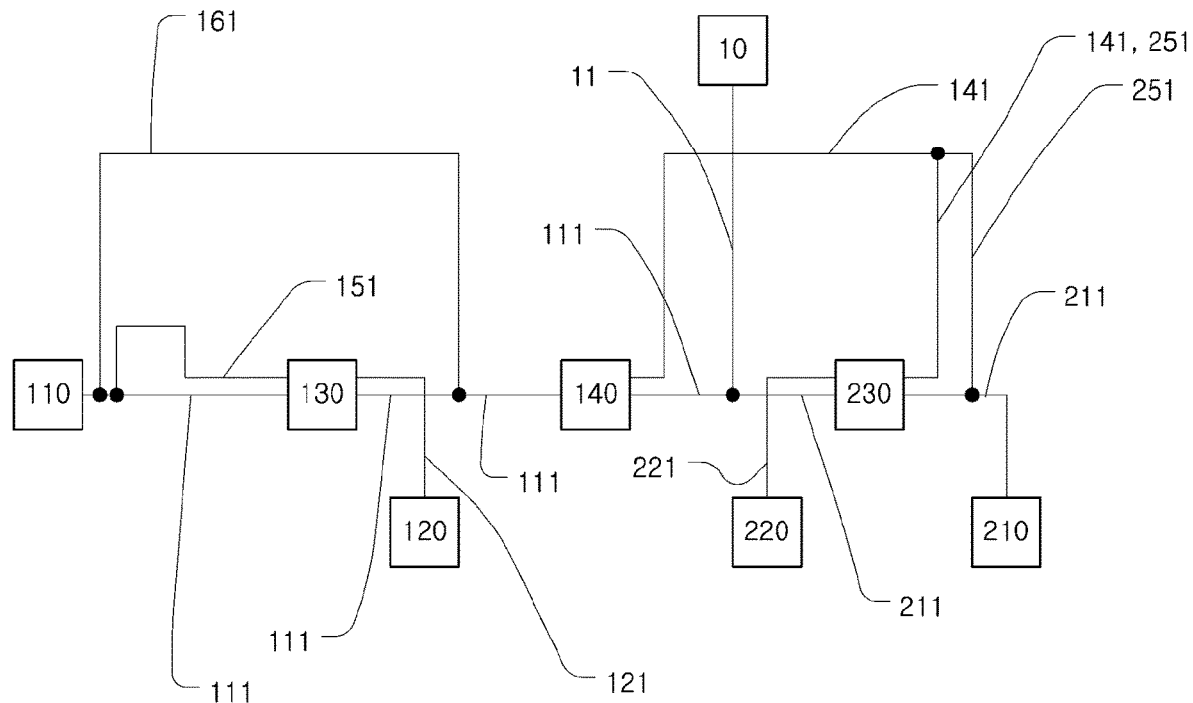
[Fig. 2]
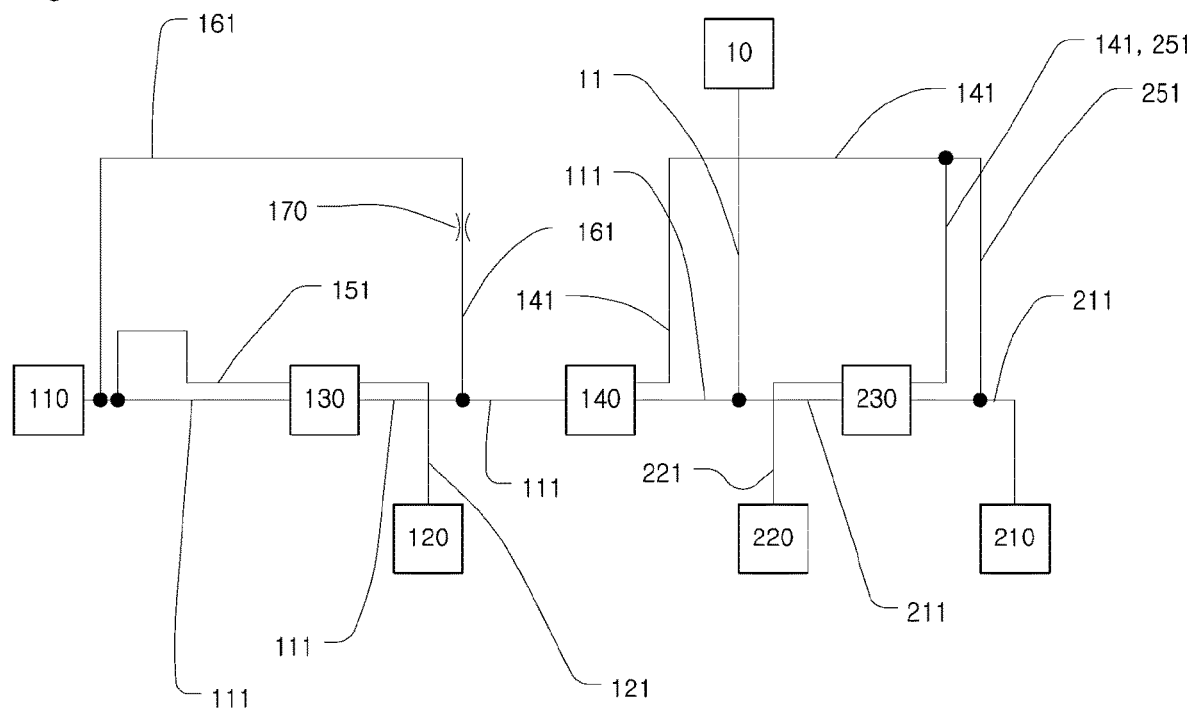

[Fig. 3]
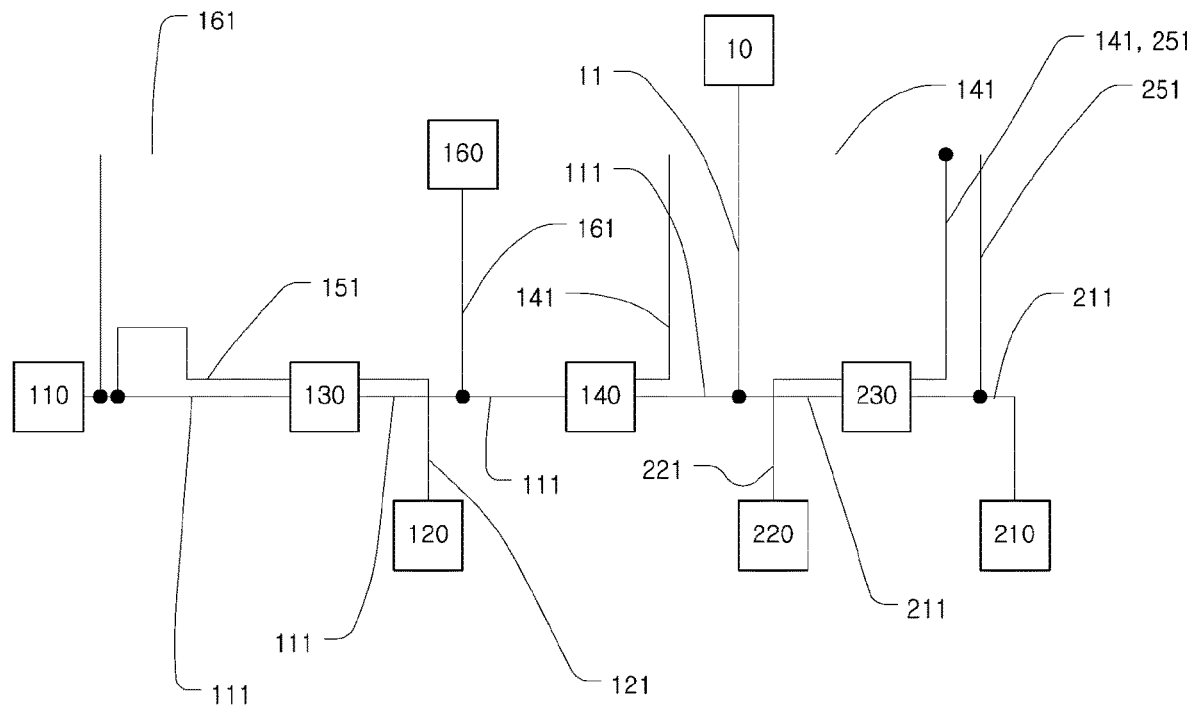
[Fig. 4]
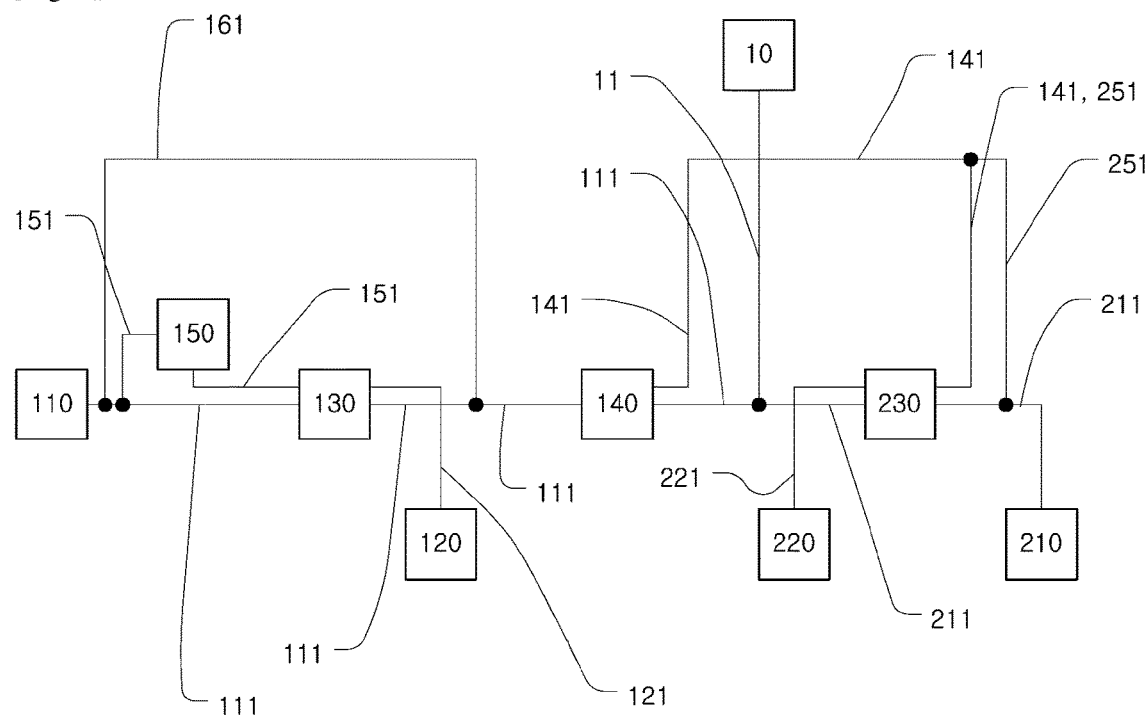

[Fig. 5]
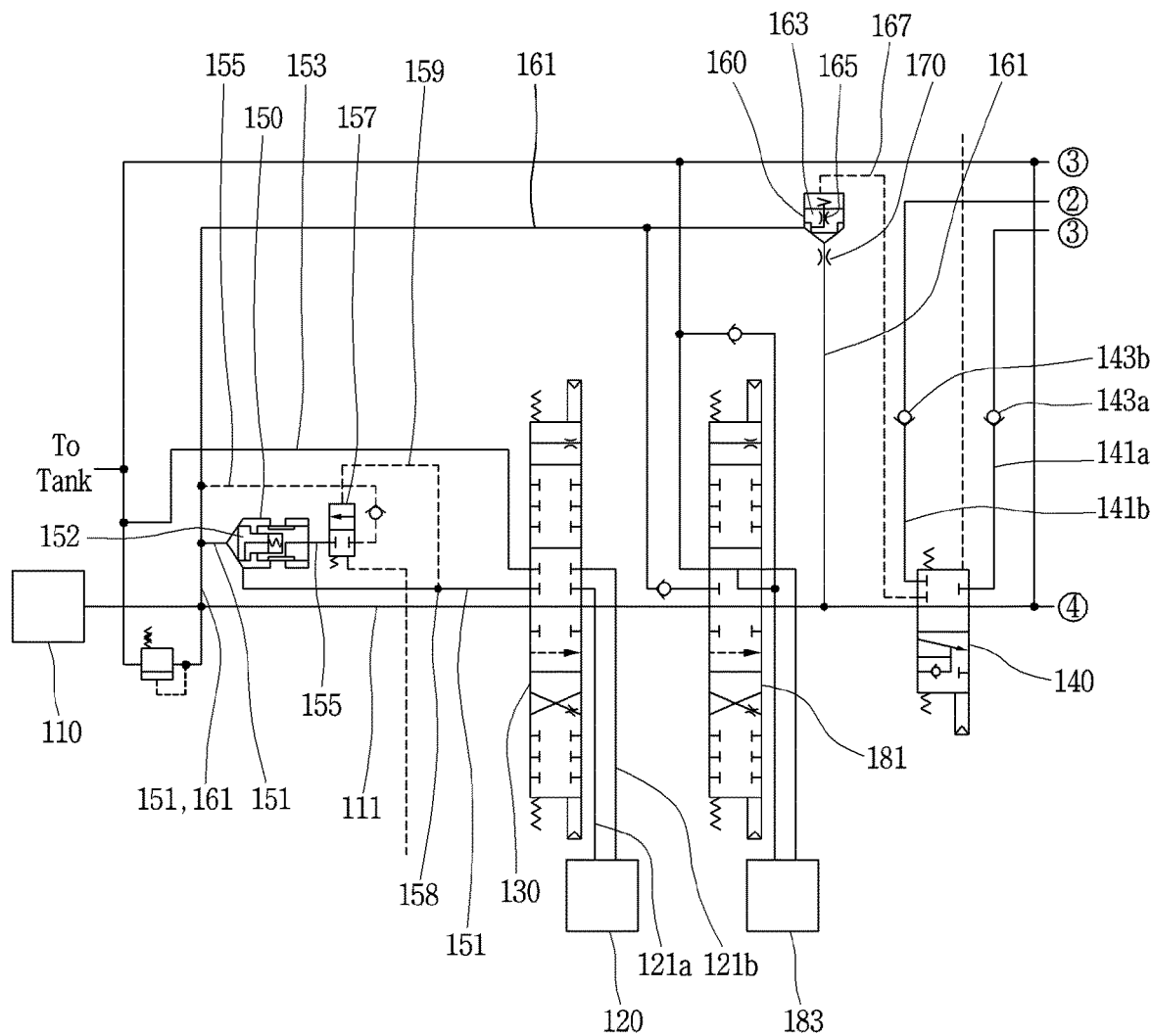

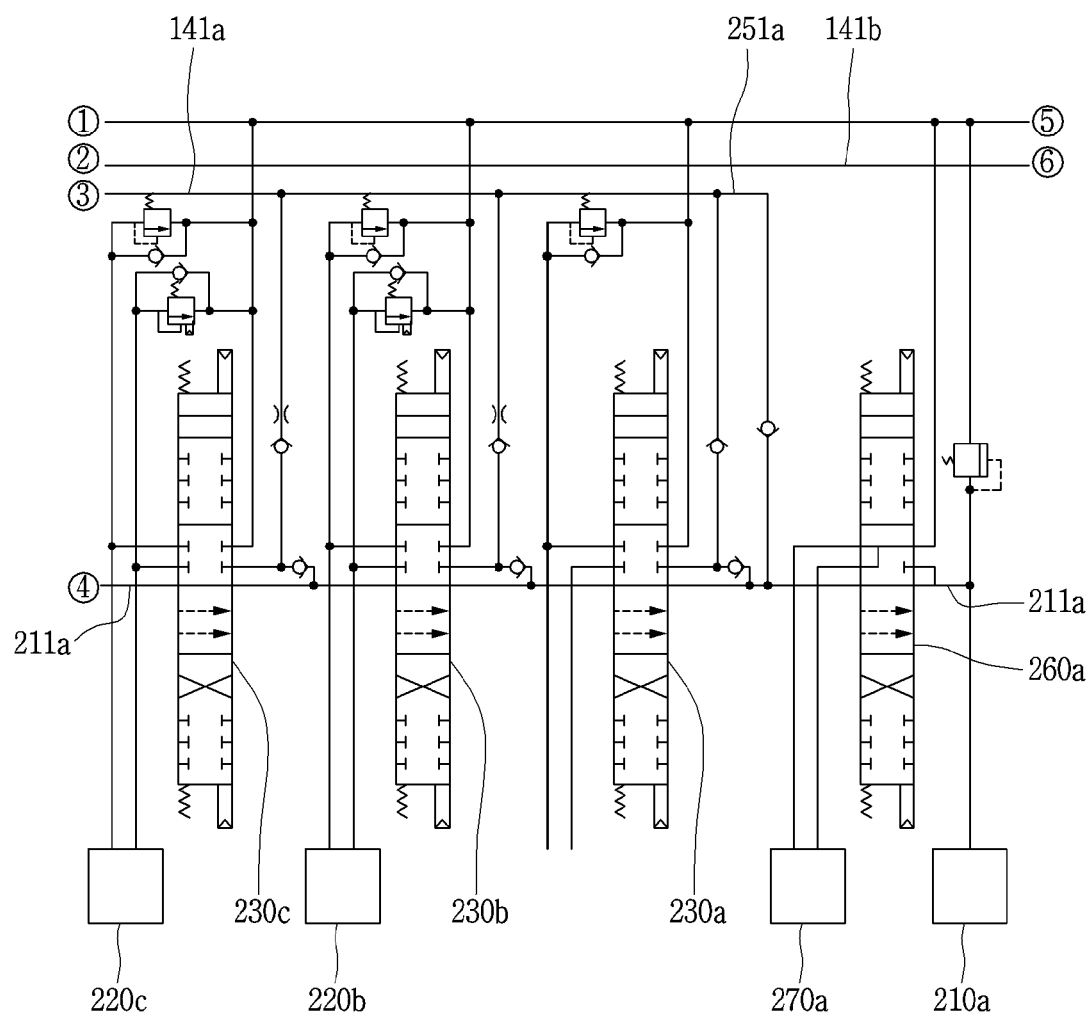
[Fig. 6]

[Fig. 7]
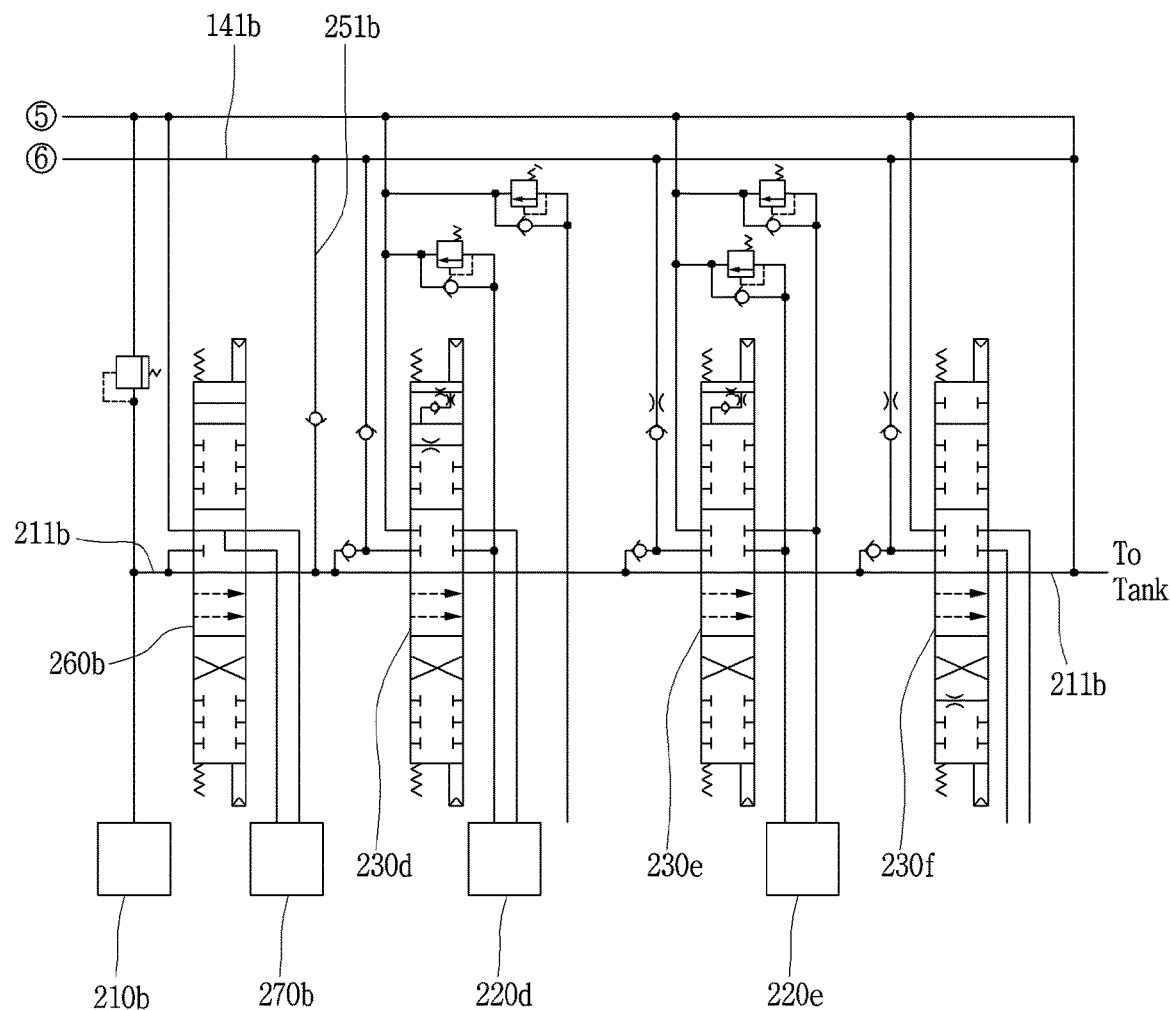

HYDRAULIC MACHINE

CROSS REFERENCE TO RELATED APPLICATIONS

This application is a 35 U.S.C. § 371 national stage application of PCT International Application No. PCT/KR2017/014885 filed on Dec. 15, 2017, the disclosure and content of which is incorporated by reference herein in its entirety.

TECHNICAL FIELD

The present disclosure relates to a hydraulic machine, and more particularly, to a hydraulic machine having a conflux function.

BACKGROUND ART

A variety of hydraulic machines obtaining power through the supply of pressurized fluid are used in construction sites, industrial sites, and the like. For example, in such a hydraulic machine, a pressurized fluid supply feeds pressurized fluid to respective actuators, and working devices connected to the respective actuators perform work using the pressure and the flow rate of the pressurized fluid.

In general, such a hydraulic machine is provided with a plurality of working fluid supplies, each of which is configured to supply working fluid to at least one actuator corresponding thereto. Some such hydraulic machines are provided with conflux valves, each of which can direct working fluid provided by a specific working fluid supply to be combined with working fluid supplied by anther working fluid supply to supply working fluid having a combined flow rate to an actuator corresponding to anther working fluid supply. Thus, even in a case in which the actuator corresponding to another working fluid supply requires a higher flow rate, it is intended to supply fluid at a sufficient flow rate (higher than a flow rate of fluid discharged by another working fluid supply) to actuators (for example, in case that two or more actuators, among actuators corresponding to another working fluid supply, are simultaneously operated).

However, in hydraulic machines of the related art, a sufficient conflux flow rate may not be obtained or flow rate distribution may not be efficiently performed, which may be problematic.

DISCLOSURE OF INVENTION

Technical Problem

Accordingly, the present disclosure has been made in consideration of the above-described problems occurring in the related art, and the present disclosure proposes efficient flow rate distribution and sufficient provision of fluid having a required flow rate to an actuator.

Solution to Problem

According to an aspect of the present disclosure, a hydraulic machine may include: a first fluid supply; a second fluid supply; a first actuator; a second actuator; a first flow control valve directing fluid from the first fluid supply to the first actuator when the first flow control valve is in a first position; a conflux control valve directing fluid from the first fluid supply to a second flow control valve when the conflux control valve is in a conflux position; the second flow control valve directing fluid from the second fluid supply and the first fluid supply to the second actuator when second flow control valve is in a second position; and a bypass path allowing the first fluid supply to communicate with the conflux control valve by passing around the first flow control valve.

BRIEF DESCRIPTION OF DRAWINGS

FIG. 1 is a circuit diagram illustrating a hydraulic machine according to exemplary embodiments;
FIG. 2 is a circuit diagram illustrating a hydraulic machine according to exemplary embodiments;
FIG. 3 is a circuit diagram illustrating a hydraulic machine according to exemplary embodiments;
FIG. 4 is a circuit diagram illustrating a hydraulic machine according to exemplary embodiments; and
FIGS. 5 to 7 are enlarged views illustrating portions of the circuit diagrams of the hydraulic machine according to exemplary embodiments.

MODE FOR THE INVENTION

Hereinafter, exemplary embodiments of the present disclosure will be described in detail with reference to the accompanying drawings.

The present disclosure is applicable to hydraulic machinery, such as construction machines and industrial machines. Although the present disclosure will mainly be directed towards embodiments applied to construction machines, such as excavators, the present disclosure is not limited thereto and may be applied to a variety of other types of hydraulic machinery.

FIG. 1 is a circuit diagram illustrating a hydraulic machine according to exemplary embodiments.

The hydraulic machine may include a first fluid supply 110, a second fluid supply 210, a first actuator 120, a second actuator 220, a first flow control valve 130, a conflux control valve 140, a second flow control valve 230, a bypass path 161, and a tank 10.

The hydraulic machine may include a power source (not shown), such as an internal combustion engine or an electric motor, driving the first fluid supply 110 and the second fluid supply 210.

The first fluid supply 110 may be a hydraulic pump that intakes fluid from the tank 10, pressurizes the intaken fluid, and supplies the pressurized fluid to a designated device. In particular, when the first fluid supply 110 is a variable displacement pump, the first fluid supply 110 may have a function of distributing flow rates to the first actuator 120 and the second actuator 220. For example, during a combined manipulation of the first actuator 120 and the second actuator 130, it is possible to reduce the flow rate of fluid discharged by the first fluid supply 110 so that the second fluid supply 210 can use greater power, thereby supplying fluid to the second actuator 220 at a sufficient flow rate.

The second fluid supply 210 may be a hydraulic pump that intakes fluid from the tank 10, pressurizes the intaken fluid, and supplies the pressurized fluid to a designated device.

The first actuator 120 may be a hydraulic cylinder or a hydraulic motor performing work using working fluid supplied by the first fluid supply 110. The first actuator 120 may be a swing actuator of an excavator.

The second actuator 220 may be a hydraulic cylinder or a hydraulic motor performing work by receiving working fluid supplied by the second fluid supply 210 and working fluid supplied (via the conflux control valve 140) by the first fluid supply 110. The second actuator 220 may be a boom actuator, an arm actuator, a bucket actuator, or an option actuator of an excavator.

A first fluid path 111 may be configured to extend from the first fluid supply 110 to pass sequentially through the first flow control valve 130 and the conflux control valve 140. Working fluid flowing on the first fluid path 111 may ultimately return to the tank 10 on a return line 11. Thus, working fluid may flow through a hydraulic circuit, in which working fluid discharged from the tank 10 may pass sequentially through the first fluid supply 110, the first fluid path 111, and the return line 11 to return to the tank 10. A second fluid path 211 may be configured to extend from the second fluid supply 210 to pass through the second flow control valve 230. Working fluid flowing on the second fluid path 211 may ultimately return to the tank 10 on the return line 11. Thus, working fluid may flow through a hydraulic circuit, in which working fluid discharged from the tank 10 may pass sequentially through the second fluid supply 210, the second fluid path 211, and the return line 11 to return to the tank 10.

A parallel path 151 may be configured to diverge from the first fluid path 111, in a location upstream of the first flow control valve 130, to be connected to the first flow control valve 130. The parallel path 151 may be configured to diverge from the second fluid path 211, in a location upstream of the second flow control valve 230, to be connected to the second flow control valve 230.

A conflux path 141 may be configured to extend from the conflux control valve 140 to be connected to the second flow control valve 230.

The first flow control valve 130 may be moved to a neutral position. When the first flow control valve 130 is in the neutral position, the first flow control valve 130 allows working fluid flowing from the first fluid supply 110 through the first fluid path 111 to continue to flow on the first fluid path 111 instead of being supplied to the first actuator 120. (Although all of the fluid path between the first fluid supply 110 and the first flow control valve 130, the fluid path between the first flow control valve 130 and the conflux control valve 140, and the fluid path downstream of the conflux control valve 140 are herein referred to as the first fluid path 111 in consideration of the functions thereof, the first fluid path 111 should not be construed as physically being a single path.) In addition, when the first flow control valve 130 is in the neutral position, a flow of working fluid flowing from the first fluid supply 110 on the parallel path 151 is cut off by the first flow control valve 130. The first flow control valve 130 may be moved to a first position. The first position may be a non-neutral position. When the first flow control valve 130 is in the first position, the first flow control valve 130 may allow working fluid flowing from the first fluid supply 110 on the parallel path 151 to be directed to the first actuator 120 on a fluid path 121. When the first flow control valve 130 is in the first position, a flow of working fluid flowing from the first fluid supply 110 on the first fluid path 111 is cut off by the first flow control valve 130.

The conflux control valve 140 may be moved to a neutral position. When the conflux control valve 140 is in the neutral position, the conflux control valve 140 allows working fluid flowing from the first fluid supply 110 on the first fluid path 111 to continue to flow on the first fluid path 111 instead of being sent to the second flow control valve 230 on the conflux path 141. The conflux control valve 140 may be moved to a conflux position. When the conflux control valve 140 is in the conflux position, the conflux control valve 140 may allow working fluid flowing from the first fluid supply 110 to be directed to the second flow control valve 230 on the conflux path 141.

The second flow control valve 230 may be moved to a neutral position. When the second flow control valve 230 is in the neutral position, the second flow control valve 230 allows working fluid flowing from the second fluid supply 210 on the second fluid path 211 to continue to flow on the second fluid path 211. (Although all of the fluid path between the second fluid supply 210 and the second flow control valve 230 and the fluid path downstream of the second flow control valve 230 are herein referred to as the second fluid path 211 in consideration of the functions thereof, the second fluid path 211 should not be construed as physically being a single path.) When the second fluid control valve 230 is in the neutral position, a flow of working fluid flowing from the first fluid supply 110 on a parallel path 251 and a flow of working fluid flowing from the first fluid supply 110 on the conflux path 141 are cut off by the second flow control valve 230. The second flow control valve 230 may be moved to a second position. The second position may be a non-neutral position. When the second flow control valve 230 is in the second position, the second flow control valve 230 may control working fluid flowing from the second fluid supply 210 on the parallel path 251 and working fluid flowing from the first fluid supply 110 on the conflux path 141 to be directed to the second actuator 220 on a fluid path 221. When the second flow control valve 230 is in the second position, a flow of working fluid flowing from the second fluid supply 210 on the second fluid path 211 is cut off by the second flow control valve 230.

The bypass path 161 may allow the first fluid supply 110 to communicate with the conflux control valve 140 by passing around the first flow control valve 130. Thus, even in the case in which the first fluid path 111 is cut off in response to the first flow control valve 130 being moved to the first position, a required flow rate can be supplied to the conflux control valve 140 on the bypass path 161. The bypass path 161 may diverge from the first fluid path 111, in a location upstream of the first flow control valve 130, to be reconnected to the first fluid path 111, in a location downstream of the first flow control valve 130.

For the conflux control valve 140 to be moved to the conflux position, the second flow control valve 230 is required to be in the second position.

The operation of the hydraulic machine illustrated in FIG. 1 will be described as follows.

a) Flow Rate Only Required for First Actuator

When an operator moves an input device (not shown) controlling the first flow control valve 130, the first flow control valve 130 is moved to the first position. Then, working fluid discharged by the first fluid supply 110 is supplied to the first actuator 120, sequentially through the first flow control valve 130 and the fluid path 121. However, the second flow control valve 230 remains in the neutral position unless the operator manipulates the input device (not shown) controlling the second flow control valve 230. Thus, working fluid discharged by the second fluid supply 210 passes sequentially through the second fluid path 211 and the return line 11 to return to the tank 10 instead of being supplied to the second actuator 220. In addition, since the conflux control valve 140 also remains in the neutral position, working fluid is not supplied to the second flow control valve 230 on the conflux path 141 by the first fluid supply 110.

b) Flow Rate Only Required for Second Actuator

When an operator moves an input device (not shown) controlling the second flow control valve 230, the second flow control valve 230 is moved to the second position. Then, working fluid discharged by the second fluid supply 210 is supplied to the second actuator 220, sequentially through the parallel path 251, the second flow control valve 230, and the fluid path 221. In addition, as the second flow control valve 230 is moved to the second position, the conflux control valve 140 is also moved to the conflux position. Thus, working fluid can be supplied to the second flow control valve 230 on the conflux path 141 by the first fluid supply 110. However, the first flow control valve 130 remains in the neutral position unless the operator manipulates the input device (not shown) controlling the first flow control valve 130. Thus, working fluid discharged by the first fluid supply 110 passes sequentially through the first fluid path 111 and the return line 11 to return to the tank 10 instead of being supplied to the first actuator 120.

c) Flow Rate Required for Both First Actuator and Second Actuator

When the operator moves the input device (not shown) controlling the first flow control valve 130, the first flow control valve 130 is moved to the first position. Then, working fluid discharged by the first fluid supply 110 is supplied to the first actuator 120, sequentially through the parallel path 151, the first flow control valve 130, and the fluid path 121. In addition, when the operator moves the input device (not shown) controlling the second flow control valve 230, the second flow control valve 230 is moved to the second position. Then, working fluid discharged by the second fluid supply 210 is supplied to the second actuator 220, sequentially through the parallel path 251, the second flow control valve 230, and the fluid path 221. In addition, as the second flow control valve 230 is moved to the second position, the conflux control valve 140 is also moved to the conflux position. Thus, working fluid can be supplied to the second flow control valve 230 on the conflux path 141 by the first fluid supply 110.

FIG. 2 is a circuit diagram illustrating a hydraulic machine according to exemplary embodiments.

The hydraulic machine may include a first orifice 170 disposed on the bypass path 161. The first orifice 170 reduces the flow rate of working fluid passing therethrough, thereby enabling efficient distribution between the flow rate of working fluid sent to the first actuator 120 via the first flow control valve 130 and the flow rate of working fluid sent to the second actuator 220 via the conflux control valve 140 and the second flow control valve 230. In addition, without the first orifice 170, when the conflux control valve 140 is in the neutral position, there is a danger that, even in the case in which the first flow control valve 130 is in the first position, working fluid discharged by the first fluid supply 110 may return to the tank 10 on the bypass path 161 (in most cases, pressure within the bypass path 161 may be lower than pressure within the parallel path 151) instead of flowing to the parallel path 151. The first orifice 170 is provided to prevent this danger. A pressure drop occurs when working fluid flowing from the first fluid supply 110 flows through the first orifice 170.

The first orifice 170 may be a fixed orifice, with the size of an open area thereof, through which fluid passes, being fixed. Alternatively, the first orifice 170 may be a variable orifice, with the size of an open area thereof, through which fluid passes, being adjustable.

FIG. 3 is a circuit diagram illustrating a hydraulic machine according to exemplary embodiments.

The hydraulic machine may include, in addition to or in substitution of the first orifice 170, a cutoff valve 160 disposed on the bypass path 161 to selectively cut off the bypass path 161. When the supply of working fluid to the second actuator 220 is not necessary, the cutoff valve 160 cuts off the bypass path 161, so that the flow rate of working fluid can be efficiently distributed. For the cutoff valve 160 to open the bypass path 161, the conflux control valve 140 is required to be in the conflux position. Without the cutoff valve 160 or with the cutoff valve 160 being in an open position, when the conflux control valve 140 is in the neutral position, there is a danger that, even in the case in which the first flow control valve 130 is in the first position, working fluid discharged by the first fluid supply 110 may return to the tank 10 on the bypass path 161 (in most cases, the pressure within the bypass path 161 may be lower than the pressure within the parallel path 151) instead of flowing to the parallel path 151. Thus, the cutoff valve 160 is provided to prevent this danger.

A circuit of moving the cutoff valve 160 using a pilot pressure of moving the conflux control valve 140 may be configured.

The hydraulic machine may include the cutoff valve 160 and the first orifice 170, illustrated in FIG. 2, on the bypass path 161. The cutoff valve 160 may be located on the bypass path 161, upstream of the first orifice 170 in the direction in which working fluid flows from the first fluid supply 110 to the conflux control valve 140, to selectively cut off the bypass path 161.

FIG. 4 is a circuit diagram illustrating a hydraulic machine according to exemplary embodiments.

The hydraulic machine may include a flow rate control valve 150 located on the parallel path 151 to control the flow rate of fluid flowing on the parallel path 151. The flow rate control valve 150 allows working fluid to be supplied at a required flow rate to the first actuator 120. When a pressure of working fluid downstream of the flow rate control valve 150 in the direction in which working fluid flows from the first fluid supply 110 to the first actuator 120, for example, a pressure within the parallel path 151 between the flow rate control valve 150 and the first flow control valve 130 is greater than a preset threshold pressure, the degree of opening of the flow rate control valve 150 may be reduced to a preset size, thereby reducing the flow rate of working fluid supplied to the first actuator 120 via the flow rate control valve 150 while allowing the remaining flow rate of working to be supplied to the second actuator 220 via the conflux control valve 140. Thus, even in the case in which flow rates are required for the first actuator 120 and the second actuator 220 at the same time, a sufficient flow rate can be supplied to the second actuator 220 without a decrease in the working rate of a working device corresponding to the second actuator 220. For example, in embodiments in which the first flow control valve 130 is a swing flow control valve and the first actuator 120 is a swing actuator, when an input device manipulating the swing flow control valve is manipulated, it is not necessary to supply a high flow rate to the swing actuator, since the swing actuator is only accelerated at the early stage. (In this case, the pressure within the parallel path 151 between the flow rate control valve 150 and the first flow control valve 130 is high.) When the pressure within the parallel path 151 between the flow rate control valve 150 and the first flow control valve 130 is equal to or higher than a preset threshold pressure (e.g. 150 kgf/cm$^2$), working fluid discharged by the first fluid supply 110 is also allowed to be supplied to the second actuator 220. In contrast, when swing acceleration is completed (in this case, the pressure the pressure within the parallel path 151 between the flow rate control valve 150 and the first flow control valve 130 is low), the swing actuator requires a higher flow rate. Then, the degree of opening of the flow rate control valve 150 may be increased so that a larger amount of working fluid can be supplied to the swing actuator.

A pressure sensor (not shown) measuring the pressure within the parallel path 151 between the flow rate control valve 150 and the first flow control valve 130 may be provided. The degree of opening of the flow rate control valve 150 may be controlled depending on the level of pressure measured by the pressure sensor.

FIGS. 5 to 7 are enlarged views illustrating portions of the circuit diagrams of the hydraulic machine according to exemplary embodiments. In the drawings, components indicated by ①, ②, ③, ④, ⑤, and ⑥ are connected to each other.

The cutoff valve 160 may include a poppet 163 opening the bypass path 161 in an open position and closing the bypass path 161 in a closed position. As described above, for the cutoff valve 160 to open the bypass path 161, the conflux control valve 140 is required to be in a conflux position. In this regard, the hydraulic machine may include a first auxiliary path 167 extending from the cutoff valve 160 to be connected to the conflux control valve 140. In addition, the cutoff valve 160 may include a second orifice 165 connecting the bypass path 161 and the first auxiliary path 167. Pressure within the bypass path 161 may provide the poppet 163 with a force for moving the poppet 163 to an open position or a force for moving the poppet 163 to a closed position.

When the conflux control valve 140 is in the neutral position, the first auxiliary path 167 is cut off by the conflux control valve 140. Since no flow of working fluid from the bypass path 161 is directed to the first auxiliary path 167 through the second orifice 165, the pressure within the first auxiliary path 167, applied to the poppet 163, is substantially the same as the pressure within the bypass path 161. The area of the poppet 163 subjected to the pressure within the first auxiliary path 167 is greater than the area of the poppet 163 subjected to the pressure within the bypass path 161. Even in the case in which the pressure within the first auxiliary path 167 is the same as the pressure within the bypass path 161, a force applied to the poppet 163 by the pressure within the first auxiliary path 167 is greater than a force applied to the poppet 163 by the pressure within the bypass path 161, thereby allowing the poppet 163 to close the bypass path 161. The cutoff valve 160 may include a spring applying the poppet 163 with a force of moving the poppet 163 to the closed position.

When the conflux control valve 140 is moved to the conflux position, the first auxiliary path 167 is opened. This consequently forms a flow of working fluid directed from the bypass path 161 to the first auxiliary path 167 through the second orifice 165. A pressure drop due to the second orifice 165 causes the pressure within the bypass path 161, applied to the poppet 163, to be higher than the pressure within the first auxiliary path 167, applied to the poppet 163. Consequently, the poppet 163 is moved to the open position, so that the bypass path 161 is opened. When the conflux control valve 140 is in the conflux position, the conflux control valve 140 may allow working fluid flowing on the first auxiliary path 167 to be combined with working fluid flowing on the first fluid path 111.

The hydraulic machine may include check valves 143a and 143b located on the conflux paths 141a and 141b to prevent working fluid from reversely flowing from the second flow control valve 230 to the conflux control valve 140.

The hydraulic machine may include a second auxiliary path 155, a switching valve 157, and a third auxiliary path 159 to operate the flow rate control valve 150. The second auxiliary path 155 (or one end thereof) may be configured to be connected to the flow rate control valve 150 to apply an actuating pressure to the flow rate control valve 150 to actuate the flow rate control valve 150. The other end of the second auxiliary path 155 may be configured to be connected to the bypass path 161. Alternatively, hydrodynamically equivalent embodiments in which the other end of the second auxiliary path 155 is connected to the parallel path 151 upstream of the flow rate control valve 150 differently from the embodiments illustrated in FIG. 5, may be realized. The switching valve 157 may be located on the second auxiliary path 155 to open the second auxiliary path 155 when the switching valve 157 is in an open position and close the second auxiliary path 155 when the switching valve 157 is in a closed position. The third auxiliary path 159 may extend from the parallel path 151, in a location 158 downstream of the flow rate control valve 150, to be connected to the switching valve 157.

When pressure within the parallel path 151, in the location 158 downstream of the flow rate control valve 150, is P1 or P2, the flow rate control valve 150 can control a flow rate of working fluid flowing on the parallel path 151 to be a minimum flow rate or a maximum flow rate. (Here, P1>P2, P1 is equal to or higher than a preset threshold pressure, and P2 is lower than the preset threshold pressure.) When the pressure within the parallel path 151, in the location 158 downstream of the flow rate control valve 150, is increased from P2 to P1, the pressure P1 is applied to the switching valve 157 on the second auxiliary path 155, thereby moving the switching valve 157 to the open position. Then, the second auxiliary path 155 is opened, so that the flow rate of working fluid passing through the flow rate control valve 150 is reduced to the minimum flow rate. (The poppet 152 of the flow rate control valve 150 is moved to the right in the drawings, thereby reducing the degree of opening of the parallel path 151.) In contrast, when the pressure within the parallel path 151, in the location 158 downstream of the flow rate control valve 150, is reduced from P1 to P2, the switching valve 157 is moved to the closed position. Then, the second auxiliary path 155 may be closed, and the flow rate of working fluid passing through the flow rate control valve 150 may be increased to the maximum flow rate. (The poppet 152 of the flow rate control valve 150 is moved to the right in the drawings, thereby increasing the degree of opening of the parallel path 151.

The hydraulic machine may include a bulldozer blade flow control valve 181 and a bulldozer blade actuator 183.

The second fluid supply 210 may include a third fluid supply 210a and a fourth fluid supply 210b. The second flow control valve 230 may include a third flow control valve and a fourth flow control valve, while the second actuator 220 may include a third actuator and a fourth actuator. In the conflux position, the conflux control valve 140 may direct working fluid from the first fluid supply 110 to the third flow control valve and the fourth flow control valve. In the third position, the third flow control valve may direct working fluid from the first fluid supply 110 and the third fluid supply 210a to the third actuator. In the fourth position, the third flow control valve may direct working fluid from the first fluid supply 110 and the fourth fluid supply 210b to the fourth actuator. The third flow control valve may be a boom (conflux) flow control valve 230a, an arm flow control valve 230b, or an option flow control valve 230c. The third actuator may be a boom actuator 220d, an arm actuator 220b, or an option actuator 220c. The fourth flow control valve may be a boom flow control valve 230d, a bucket flow control valve 230e, or an arm (conflux) flow control valve 230f. The third actuator may be the boom actuator 220d, a bucket actuator 220e, or the arm actuator 220b.

The hydraulic machine may include a left travel flow control valve 260a, a left travel actuator 270a, a right travel flow control valve 260b, and a right travel actuator 270b.

A circuit may be configured such that, for the conflux control valve 140 to be moved to the conflux position, the second flow control valve, i.e. at least one of the boom (conflux) flow control valve 230a, the arm flow control valve 230b, the option flow control valve 230c, the boom flow control valve 230d, the bucket flow control valve 230e, and the arm (conflux) flow control valve 230f, is required to be in a second position, i.e. a neutral position, and at least one of the left travel flow control valve 260a and the right travel flow control valve 260b is in a non-neutral position. When the travel control valves 260a and 260b are moved to non-neutral positions, the second fluid path, i.e. the third fluid path 211a and the fourth fluid path 211b, is cut off, thereby preventing working fluid discharged by the second fluid supply, i.e. the third and fourth fluid supplies 210a and 210b, from being supplied to the second flow control valve. In this regard, the hydraulic machine illustrated in FIGS. 5 to 7 is configured to supply working fluid discharged by the first fluid supply 110 to the second flow control valve on the conflux paths 141a and 141b.

The hydraulic machine may include input devices (not shown) for adjusting the positions of the swing flow control valve, the bulldozer blade flow control valve 181, the left travel flow control valve 260a, the arm flow control valve 230b, the option flow control valve 230c, the right travel flow control valve 260b, the boom flow control valve 230d, and the bucket flow control valve 230e. Pressures of pilot fluid corresponding to inputs from the input devices may be applied to the control valves, respectively, to move the control valves. In addition, the hydraulic machine may include a pilot fluid supply (not shown) supplying pilot fluid. The pilot fluid supply may be a pump. The pilot fluid supply may be driven by the above-described power source.

The invention claimed is:

1. A hydraulic machine comprising:
a first fluid supply;
a second fluid supply;
a first actuator;
a second actuator;
a first flow control valve directing fluid from the first fluid supply to the first actuator when the first flow control valve is in a first position;
a second flow control valve;
a conflux control valve directing fluid from the first fluid supply to the second flow control valve when the conflux control valve is in a conflux position such that the second flow control valve directs fluid from the second fluid supply and the first fluid supply to the second actuator when second flow control valve is in a second position;
a bypass path allowing the first fluid supply to communicate with the conflux control valve by passing around the first flow control valve such that the conflux control valve directs fluid from the first fluid supply through the bypass path to the second flow control valve when the conflux control valve is in the conflux position, a first orifice located on the bypass path, and
a cutoff valve located on the bypass path, in a location upstream of the first orifice, to selectively cut off the bypass path.

2. The hydraulic machine of claim 1, further comprising:
a first fluid path extending from the first fluid supply and passing sequentially through the first flow control valve and the conflux control valve; and
a second fluid path extending from the second fluid supply and passing through the second flow control valve.

3. The hydraulic machine of claim 2, wherein the bypass path diverges from the first fluid path, in a location upstream of the first flow control valve, and is reconnected to the first fluid path, in a location downstream of the first flow control valve.

4. The hydraulic machine of claim 1, wherein the conflux control valve is required to be in the conflux position for the cutoff valve to open the bypass path.

5. The hydraulic machine of claim 1, further comprising a first auxiliary path extending from the cutoff valve to be connected to the conflux control valve,
wherein the cutoff valve comprises a poppet opening the bypass path in an open position and closing the bypass path in a closed position and a second orifice connecting the bypass path and the first auxiliary path,
pressure within the bypass path is applied to the poppet such that the poppet is subjected to a force for moving the poppet to the open position, and
pressure within the first auxiliary path is applied to the poppet such that the poppet is subjected to a force for moving the poppet to the closed position.

6. The hydraulic machine of claim 5, wherein the conflux control valve allows fluid flowing on the first auxiliary path to be combined with fluid flowing on the first fluid path when the conflux control valve is in the conflux position.

7. The hydraulic machine of claim 1, wherein the second flow control valve is required to be in the second position for the conflux control valve to be moved to the conflux position.

8. The hydraulic machine of claim 1, further comprising:
a conflux path extending from the conflux control valve to be connected to the second flow control valve; and
a check valve located on the conflux path to prevent fluid from flowing from the second flow control valve to the conflux control valve.

9. The hydraulic machine of claim 1, wherein the second fluid supply comprises a third fluid supply and a fourth fluid supply,
the second actuator comprises a third actuator and a fourth actuator,
the second flow control valve comprises a third flow control valve and a fourth flow control valve,
the conflux control valve directs fluid flowing from the first fluid supply to the third flow control valve and the fourth flow control valve when the conflux control valve is in the conflux position,
the third flow control valve directs fluid flowing from the first fluid supply and the third fluid supply to the third actuator when the third flow control valve is in a third position, and
the fourth flow control valve directs fluid flowing from the first fluid supply and the fourth fluid supply to the fourth actuator when the fourth flow control valve is in a fourth position.

10. The hydraulic machine of claim 1, wherein the first actuator comprises a swing actuator, and the second actuator comprises a boom actuator, an arm actuator, a bucket actuator, or an option actuator.

11. A hydraulic machine comprising:
- a first fluid supply;
- a second fluid supply;
- a first actuator;
- a second actuator;
- a first flow control valve directing fluid from the first fluid supply to the first actuator when the first flow control valve is in a first position;
- a second flow control valve;
- a conflux control valve directing fluid from the first fluid supply to the second flow control valve when the conflux control valve is in a conflux position such that the second flow control valve directs fluid from the second fluid supply and the first fluid supply to the second actuator when second flow control valve is in a second position;
  - a bypass path allowing the first fluid supply to communicate with the conflux control valve by passing around the first flow control valve such that the conflux control valve directs fluid from the first fluid supply through the bypass path to the second flow control valve when the conflux control valve is in the conflux position;
- a parallel path diverging from a first fluid path, the first fluid path extending from the first fluid supply and passing sequentially through the first flow control valve and the conflux control valve, in a location upstream of the first flow control valve, to be connected to the first flow control valve, the first flow control valve directing fluid flowing on the parallel path to the first actuator when the first flow control valve is in the first position; and
- a flow rate control valve located on the parallel path to control a flow rate of fluid flowing on the parallel path.

12. The hydraulic machine of claim 11, wherein the flow control valve controls the flow rate of fluid flowing on the parallel path such that the flow rate is a minimum flow rate when a pressure within the parallel path, in a location downstream of the flow control valve, is P1, or such that the flow rate is a maximum flow rate when the pressure within the parallel path is P2, where P1>P2.

13. The hydraulic machine of claim 12, further comprising:
- a second auxiliary path connected to the flow control valve;
- a switching valve located on the second auxiliary path to open the second auxiliary path when the switching valve is in an open position and closing the second auxiliary path when the switching valve is in a closed position; and
- a third auxiliary path extending from the parallel path, in the location downstream of the flow control valve, to be connected to the switching valve, wherein, when the pressure within the parallel path, in the location downstream of the flow control valve, is increased from P2 to P1, the switching valve is moved to the open position, the second auxiliary path is opened, and the flow rate of fluid passing through the flow control valve is reduced to the minimum flow rate, and when the pressure within the parallel path, in the location downstream of the flow control valve, is reduced from P1 to P2, the switching valve is moved to the closed position, the second auxiliary path is closed, and the flow rate of fluid passing through the flow control valve is increased to the maximum flow rate.

14. The hydraulic machine of claim 11, further comprising:
- a conflux path extending from the conflux control valve to be connected to the second flow control valve; and
- a check valve located on the conflux path to prevent fluid from flowing from the second flow control valve to the conflux control valve.

15. The hydraulic machine of claim 11, wherein the second fluid supply comprises a third fluid supply and a fourth fluid supply,
- the second actuator comprises a third actuator and a fourth actuator,
- the second flow control valve comprises a third flow control valve and a fourth flow control valve,
- the conflux control valve directs fluid flowing from the first fluid supply to the third flow control valve and the fourth flow control valve when the conflux control valve is in the conflux position,
- the third flow control valve directs fluid flowing from the first fluid supply and the third fluid supply to the third actuator when the third flow control valve is in a third position, and
- the fourth flow control valve directs fluid flowing from the first fluid supply and the fourth fluid supply to the fourth actuator when the fourth flow control valve is in a fourth position.

16. The hydraulic machine of claim 11, wherein the first actuator comprises a swing actuator, and
the second actuator comprises a boom actuator, an arm actuator, a bucket actuator, or an option actuator.

* * * * *